United States Patent
Breyer et al.

(10) Patent No.: US 8,252,427 B2
(45) Date of Patent: Aug. 28, 2012

(54) BONDING WOOD COMPOSITES WITH RESIN SOLIDS-FORTIFIED PHENOL-FORMALDEHYDE RESIN

(75) Inventors: Robert A. Breyer, Tucker, GA (US); James H. Knight, Conyers, GA (US); Daniel C. Yeager, Smyrna, GA (US); Herbert J. Kennedy, Monroeville, AL (US); Harmon E. Brehmer, Jr., Newberry, SC (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 13/087,719

(22) Filed: Apr. 15, 2011

(65) Prior Publication Data

US 2011/0262760 A1    Oct. 27, 2011

Related U.S. Application Data

(60) Provisional application No. 61/327,280, filed on Apr. 23, 2010.

(51) Int. Cl.
  *B32B 21/04* (2006.01)
(52) U.S. Cl. .................. 428/537.1; 428/292.4; 428/326; 428/355 AK; 156/335

(58) Field of Classification Search ............... 428/537.1, 428/292.4, 326, 355 AK; 156/335
See application file for complete search history.

(56) References Cited

U.S. PATENT DOCUMENTS

| 2,620,288 | A |   | 12/1952 | Schrader et al. |
| 4,824,896 | A | * | 4/1989  | Clarke et al. ............... 524/405 |
| 5,173,527 | A | * | 12/1992 | Calve ............................. 524/74 |
| 5,217,665 | A |   | 6/1993  | Lim et al. |
| 5,223,587 | A | * | 6/1993  | Tsuruta ......................... 525/501 |
| 8,007,698 | B2 | * | 8/2011 | Baxter et al. .................. 264/83 |

OTHER PUBLICATIONS

International Search Report and Written Opinion of the International Search Authority, mailed Dec. 22, 2011.

* cited by examiner

*Primary Examiner* — Leszek Kiliman
(74) *Attorney, Agent, or Firm* — Ram W. Sabnis

(57) ABSTRACT

The invention comprises an aqueous phenol-formaldehyde resole resin liquid fortified with powdered (e.g., spray dried) phenol-formaldehyde resole resin, preparing wood composites, particularly oriented strand board (OSB), waferboard, particleboard, medium density fiber board, and hardboard, using the solids-fortified liquid resin, and related wood composites bonded with the solids-fortified resin.

9 Claims, 3 Drawing Sheets

BONDING WOOD COMPOSITES WITH RESIN SOLIDS-FORTIFIED PHENOL-FORMALDEHYDE RESIN

CROSS-REFERENCE TO RELATED APPLICATION

This application claims priority to U.S. Provisional Patent Application No. 61/327,280 filed Apr. 23, 2010, the disclosure of which is incorporated herein in its entirety by this reference.

FIELD OF THE INVENTION

The present invention is directed to an aqueous phenol-formaldehyde resole resin liquid fortified with powdered (e.g., spray dried) phenol-formaldehyde resole resin, to a method of preparing wood composites, particularly oriented strand board (OSB), plywood, laminated veneer lumber (LVL), waferboard, particleboard, medium density fiber board, and hardboard, using the solids-fortified liquid resin, and to the related wood composites bonded with the solids-fortified resin.

BACKGROUND OF THE INVENTION

Wood-resin composite products, such as plywood, laminated veneer lumber (LVL), oriented strand lumber (OSL), oriented strand board (OSB), waferboard, particleboard, medium density fiber board, hardboard and the like, traditionally have been made by combining a binder resin with wood components (wood pieces) to form a stack or mat which is then consolidated in a hot platen press to cure the binder resin.

In some products, such as plywood and laminated veneer lumber (LVL), an adhesive binder mixture is used in which an aqueous phenol-formaldehyde resole resin liquid constitutes the major ingredient, but that ingredient is supplemented with additional components such as additional caustic, amylaceous extenders such as wheat flour, proteinaceous extenders such as soya flour, fillers such as nutshell flours, tree bark flours and clays, viscosity control agents and the like. Extenders are components which have some inherent adhesive characteristics of theft own and thus can be considered supplemental adhesives in the adhesive binder mixture. Fillers are components which, on the other hand, are not significantly adhesive, but which improve the adhesive binder mixture's working properties, performance, strength or the like.

In preparing other products, such as the manufacture of OSB and waferboard, the phenol-formaldehyde resole resin substantially constitutes the sole adhesive ingredient for the adhesive binder formulation; fillers and extenders are not typically used.

In some cases, the phenol-formaldehyde resin may be supplied in the form of a powder, rather than as an aqueous liquid. Manufacturing OSB and waferboard are applications where phenol-formaldehyde resin powders, in particular, find a sizeable amount of use. The powdered phenol-formaldehyde resins are thought to have a number of advantages over liquid resins in such applications, such as: (a) simple and less expensive equipment often can be used for handling and blending the resin with the wood furnish; (b) powdered resins are easy to blend onto wood wafers and strands, and (c) powdered resins generally have a longer storage life so inventory control is easier to manage.

Historically, such phenol-formaldehyde resin powders are prepared principally by spray-drying a liquid phenol-formaldehyde precursor resin made under alkaline conditions (i.e., a resole resin) in the presence of a caustic, i.e., sodium hydroxide, catalyst. Such resins are fast curing and provide wood composites of high strength.

U.S. Pat. No. 5,217,665 describes making waferboard using both a liquid phenol formaldehyde resin and a powdered phenol formaldehyde resin. According to this patent the liquid and solid resin components are applied separately to the wood wafers. For example, in one embodiment, liquid phenol-formaldehyde resin is applied first to the surface of the wafers followed by an application of powdered phenol-formaldehyde resin, a layup of the so-treated wafers then is formed and the layup of wafers is pressed at an elevated temperature and pressure to consolidate the layup into a board and cure the phenol formaldehyde adhesive. When the liquid and solid resins are used in combination, the solid resin constitutes at least 25% by weight of the total applied phenolic resin.

The present invention is based on the discovery that the addition of a small amount of powdered, e.g., spray-dried, phenol-formaldehyde resole resin into an aqueous phenol-formaldehyde resole resin liquid used an adhesive binder for making wood composites improves production capacity, improves bond quality and expands the operating conditions for making acceptable composite products.

SUMMARY OF THE INVENTION

In one embodiment, the present invention is directed to an adhesive binder formulation comprising a fluid mixture of an aqueous phenol-formaldehyde resole resin liquid and a powdered phenol-formaldehyde resole resin, wherein the powdered phenol-formaldehyde resole resin is dispersed in the aqueous phenol-formaldehyde resole resin liquid.

In one embodiment, the present invention is directed to an adhesive binder formulation consisting essentially of a fluid mixture of an aqueous phenol-formaldehyde resole resin liquid and a powdered phenol-formaldehyde resole resin, wherein the powdered phenol-formaldehyde resole resin is dispersed in the aqueous phenol-formaldehyde resole resin liquid.

In such embodiments, the powdered phenol-formaldehyde resole resin can be dispersed in the aqueous phenol-formaldehyde resole resin liquid in an amount of from 0.2 to 10% by weight of the solids in the aqueous phenol-formaldehyde resole resin liquid, i.e., from 0.2 part by weight to 10 parts by weight of powdered phenol-formaldehyde resole resin solids are used for every 100 parts by weight of the dissolved resin solids in the aqueous phenol-formaldehyde resole resin liquid, and more usually from 0.2 to 5% by weight of the solids in the aqueous phenol-formaldehyde resole resin liquid.

In one embodiment, the present invention is directed to a method of making a wood composite which comprises applying an adhesive binder formulation to wood substrates, wherein the adhesive binder formulation comprises a fluid mixture of an aqueous phenol-formaldehyde resole resin liquid and a powdered phenol-formaldehyde resole resin, wherein the powdered phenol-formaldehyde resole resin is dispersed in the aqueous phenol-formaldehyde resole resin liquid, and consolidating the wood substrates with the applied adhesive binder formulation under conditions to produce the wood composite.

In one embodiment, the present invention is directed to a method of making a wood composite which comprises applying an adhesive binder formulation to wood substrates comprising wood pieces, wherein the adhesive binder formulation consists essentially of a fluid mixture of an aqueous phenol-formaldehyde resole resin liquid and a powdered phenol-formaldehyde resole resin, wherein the powdered phenol-formaldehyde resole resin is dispersed in the aqueous phenol-formaldehyde resole resin liquid, and consolidating the wood pieces with the applied the adhesive binder formulation under conditions to produce the wood composite.

In such embodiments, the powdered phenol-formaldehyde resole resin can be dispersed in the aqueous phenol-formaldehyde resole resin liquid in an amount of from 0.2 to 10% by weight of the solids in the aqueous phenol-formaldehyde resole resin liquid, i.e., from 0.2 part by weight to 10 parts by weight of powdered phenol-formaldehyde resole resin solids are used for every 100 parts by weight of the dissolved solids in the aqueous phenol-formaldehyde resole resin liquid, and more usually from 0.2 to 5% by weight of the solids in the aqueous phenol-formaldehyde resole resin liquid.

In such embodiments, the wood substrates can be selected from wood veneer, wood strands, wood wafers, and wood particles.

In such embodiments, the wood pieces can be selected from wood strands, wood wafers, and wood particles.

In such embodiments, the present invention is directed to a method for preparing a wood composite wherein the consolidation of the wood substrates with the applied adhesive binder formulation to produce the wood composite is accomplished by hot pressing a mat or panel comprising wood substrates having applied thereto the adhesive binder formulation.

DETAILED DESCRIPTION OF THE INVENTION

Figure 1:
FIG. 1 is a photograph of an optical microscopic enlargement of a suspension of powdered phenol-formaldehyde resole resin particles dispersed in an aqueous phenol-formaldehyde resole resin liquid for 2 days.

The present invention is directed to an adhesive binder formulation comprising a fluid mixture of a powdered phenol-formaldehyde resole resin and an aqueous phenol-formaldehyde resole resin liquid. In the fluid mixture, the particles of the powdered phenol-formaldehyde resole resin are dispersed throughout the aqueous phenol-formaldehyde resole resin liquid. The suspension of powdered phenol-formaldehyde resole resin particles dispersed in the aqueous phenol-formaldehyde resole resin liquid is stable under ambient conditions for at least a week. Even at elevated temperatures (i.e., 55° C.) and under constant agitation using a paddle mixer, the suspension was stable for at least 5 days.

One suitable source of the powdered phenol-formaldehyde resole resin is a powdered resole resin made by spray-drying an aqueous, alkaline phenol-formaldehyde resole resin composition (also referred to as a spray-dry precursor resin).

Usually, an aqueous phenol-formaldehyde resole resin composition suitable to be spray-dried has an initial solids content of between about 30 and 65 weight percent, more often, the aqueous phenol-formaldehyde resole resin composition to be spray-dried has an initial solids content of between about 30 and 45 weight percent. As used herein, the solids content of a resole resin composition is measured, as understood by those skilled in the art, by determining the weight loss upon heating a small, e.g., 1-5 gram, sample of the aqueous resole resin composition at about 105° C. for a time sufficient to remove any water. By measuring the weight of the sample before and after heating, the percent solids in the sample can be calculated directly.

An aqueous phenol-formaldehyde resole resin composition useful for spray-drying to produce a powdered phenol-formaldehyde resole resin suitable for use in accordance with the present invention is a phenol-formaldehyde resole resin composition prepared under aqueous alkaline reaction conditions using a molar excess of a formaldehyde component. For example, a suitable phenol-formaldehyde resole resin composition can be prepared at a final mole ratio of a formaldehyde component to a phenol component (F:P) in the range of 2.00:1 to 2.65:1, and usually within the range of about 2.25:1 to 2.65:1.

Phenol-formaldehyde resin compositions prepared within such a mole ratio range typically have a molecular weight (weight average or number average) in a range of 1000 to 8000 daltons. Such resin compositions are commonly referred to as "resole resins." A particularly suitable aqueous phenol-formaldehyde resole resin composition can be made at a formaldehyde:phenol (F:P) mole ratio in the range of about 2.4:1 to 2.5:1, e.g., an F:P mole ratio of 2.45:1.

A suitable aqueous phenol-formaldehyde resole resin composition can be produced by reacting a phenol component and a formaldehyde component in water under an alkaline condition so as to yield a phenol-formaldehyde resole resin having a weight average (or number average) molecular weight of between about 1000 and 8000 daltons, usually between 1500 and 5000 daltons, more usually between 1800 to 4500 daltons, and most often between 2000 to 4000 daltons.

As known by those skilled in the art, polymer molecular weights can be determined using Gel Permeation Chromatography (GPC), which allows for the determination of a polymer's polydispersity index, as well as its viscosity molecular weight ($M_v$). Based on other data, the number average ($M_n$), the weight average ($M_w$) and the size average ($M_z$) molecular weights also can be determined.

The GPC method uses tetrahydrofuran as a solvent/diluent and a system of two mixed C chromatographic columns preceding a 500 Angstroms PLgel column, all available from Polymer Laboratories (now part of Varian, Inc.). The column arrangement is calibrated using a range of polystyrene standards. For determining the molecular weight of a particular resin sample, the sample is injected along with polystyrene, such as having a molecular weight of 250,000 daltons, and toluene as an internal standard. A Model 759A Absorbance Detector from Applied Biosystems is used to monitor the column output and assist the molecular weight determination. The method of determining the molecular weight of a phenol-formaldehyde resin is well understood by those skilled in the art.

Suitable methods for synthesizing an aqueous phenol-formaldehyde resole resin composition (spray dry precursor resin) for spray-drying include both single step processes, and "programmed" processes (i.e., staged monomer and/or staged catalyst additions). While batch operations are the standard, continuous processes are also possible. In its broadest aspects, the present invention is not limited to any particular way for making the aqueous phenol-formaldehyde resole resin composition which is destined to be spray-dried. Standard conditions, procedures and reactants for making an aqueous resole resin, well-known to those skilled in the art, can be used.

For example, a suitable resin may be synthesized by adding a formaldehyde component such as formaldehyde itself to a reactor already containing a phenol component such as phenol itself, in an amount sufficient to establish an initial mole ratio (F:P) in the range of 0.6:1 to 1.6:1. The formaldehyde component is thereafter reacted, under an alkaline reaction condition, with the phenol component in the aqueous solution. Following the initial reaction, an additional amount of formaldehyde component is added to the aqueous solution, sufficient to establish a cumulative mole ratio (F:P) in the range of 2.00:1 to 2.65:1.

Prior to any dilution before spray-drying, the aqueous phenol-formaldehyde resole resin composition used in this invention typically has a resin solids content of about 30% to 65% by weight, usually from about 30% to 50% solids by weight and often from 30% to 45% solids by weight.

Conveniently, a batch process can be used to synthesize a suitable aqueous phenol-formaldehyde spray-dry precursor resole resin composition by a single-stage alkaline condensation of a phenol component and a formaldehyde component under a vacuum reflux at a temperature between 50° and 100° C. (122° to 212° F.), usually above 70° C. (158° F.), and often above 80° C. (176° F.).

In accordance with the present invention, the molar ratio of the formaldehyde component to the phenol component for making the aqueous phenol-formaldehyde resole resin composition typically is in the range of 2.00:1 to 2.65:1 (usually 2.25:1 to 2.65:1), and most often in the range of 2.40 to 2.50.

A phenol-formaldehyde resole spray dry precursor resin composition can be further modified by the post addition of caustic and other common additives such as urea and aqueous ammonia, which often are added to reduce the residual level of free, unreacted formaldehyde in the synthesized resin.

When preparing an aqueous phenol-formaldehyde resole resin composition, an alkaline catalyst is used to promote the reaction of the formaldehyde component with the phenol component. The catalyst is usually one of the inorganic or organic alkaline catalysts known to be useful in preparing phenol-formaldehyde resole resins. Typical catalysts include alkali metal hydroxides, such as sodium hydroxide, lithium hydroxide, potassium hydroxide, or mixtures thereof. Generally sodium hydroxide is used based on its cost, availability and suitability. Other catalysts include alkali metal carbonates such as sodium carbonate and potassium carbonate, alkaline earth metal hydroxides such as magnesium hydroxide, calcium hydroxide and barium hydroxide, and organic amines. The catalyst usually is used in a low but effective amount to catalyze the reaction.

As noted, an aqueous phenol-formaldehyde resole resin composition can also be prepared using staged addition processes. Methods for preparing phenol-formaldehyde resole resins by staged addition are known. When preparing the aqueous phenol-formaldehyde resole resin composition in this way, the formaldehyde component can be added gradually to the phenol, and/or phenol can be added gradually to the formaldehyde component and/or the alkaline catalyst can be added gradually to a mixture of formaldehyde and phenol components to promote a controlled polymerization. Other combinations also are possible.

In any of these synthesis processes (and in the preparation of the solid phenol-formaldehyde component), the phenol-formaldehyde resole resin composition may be prepared using reactants that are commercially available in many forms. Formaldehyde is available as paraformaldehyde (a solid, polymerized formaldehyde) and more conveniently as formalin solutions (aqueous solutions of formaldehyde, sometimes with methanol, usually in 37%, 44%, or 50% formaldehyde concentrations). Formaldehyde also may be available as a gas. In the broad practice of the present invention, any of these forms may be suitable. Further, in some circumstances the formaldehyde may be partially replaced with other suitable aldehydes, such as acetaldehyde or furaldehyde, as known in the wood composite art. Thus, the formaldehyde component for making the phenol-formaldehyde resole resin composition is not limited to formaldehyde itself, but encompasses any formaldehyde derivative and other aldehydes or derivatives thereof which are known in the art to be useful in conjunction with phenol-formaldehyde resins. However, formaldehyde is the preferred aldehyde. Thus, it is understood that when the formaldehyde component of the resin is referred to herein, this refers to formaldehyde, formaldehyde derivatives, and other aldehydes. Typically, a formalin solution low in methanol is used as the formaldehyde source.

Phenol is generally used for making the aqueous phenol-formaldehyde resole resin composition that is spray-dried to produce the resole resin powder used in accordance with the present invention, but may be replaced, partially or totally in some cases, with other phenolic compounds un-substituted at either the two ortho positions or at one ortho and the para position, i.e., the phenol component. These unsubstituted positions are necessary for the desired polymerization reaction(s) to occur. Other phenol compounds substituted in these positions may be used in lesser quantities (e.g., up to about 10 weight % of the phenol) as it is known in the art to control molecular weight by a chain termination reaction using such phenolic compounds. Any one, all, or none of the remaining carbon atoms of the phenol ring can be substituted in a conventional fashion. The nature of the substituents can vary widely, and it is only necessary that the substituent not interfere in the polymerization of the aldehyde with the phenol at the ortho and/or para positions. Substituted phenols which optionally can be employed in the formation of the aqueous phenol-formaldehyde resole resin include alkyl substituted phenols, aryl substituted phenols, cycloalkyl substituted phenols, alkenyl substituted phenols, alkoxy substituted phenols, aryloxy substituted phenols, and halogen substituted phenols, the foregoing substituents possibly containing from 1 to 26, and usually from 1 to 9, carbon atoms.

Specific examples of suitable phenolic compounds (phenol components) for replacing a portion or all of the phenol used in preparing the phenol-formaldehyde resin compositions used in the present invention include: bis-phenol A, bis-phenol F, o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof. Therefore, it is also understood that when the phenol component of the resin is referred to herein, this refers to both phenol itself and phenol derivatives.

The aqueous phenol-formaldehyde spray dry precursor resin composition, e.g., the resole resin composition, usually has an alkalinity, i.e., contains a base, in the range of 0.5% to about 15%, more usually in the range of 1% to 12%, and particularly in the range of 2% to 8%, e.g., 6%, based on the weight of the aqueous resole resin composition, when the base is sodium hydroxide. If a different base is used, the alkalinity content should be proportioned to be equivalent on a molar weight basis to the above noted range based on sodium hydroxide. For example, to attain the equivalent of an alkalinity of 6% sodium hydroxide, i.e., 6 grams of sodium hydroxide in 100 grams of aqueous resin, about 8.4 grams of potassium hydroxide in 100 grams of the resin solution would be required. As noted above, the base conveniently may be an alkali metal or alkaline earth metal compound such as a hydroxide, a carbonate, or an oxide.

Methods for spray-drying an aqueous resole resin composition are well known to those skilled in the art of preparing powdered adhesives for wood composite binders and a detailed description of the spray-drying equipment and spray-drying process variables are unnecessary. Spray drying refers to the technically sophisticated process of atomizing (in the form of small droplets) the aqueous resin into a gas stream (often a heated air stream) under controlled temperature conditions and under specific gas/liquid contacting conditions to effect evaporation of water from the atomized droplets and production of a dry particulate solid product.

In the spray drying process, a liquid phenol-aldehyde resin composition, as-synthesized or often after further dilution, is atomized to small droplets and mixed with hot air (e.g., air at an inlet temperature usually between 140° to 250° C. (284° to 482° F.) to evaporate the water from the resin droplets. The temperature of the resin during the spray-drying process is usually close to the boiling water temperature or higher. An outlet air temperature of between 60° to 120° C. (140° to 248° F.) is common. Due to the curable (thermosetting) character of the resole resin, adjusting the operation of the spray-drying process to achieve thorough evaporation of the moisture at the lowest possible inlet and outlet temperatures is generally desired.

Spray drying is typically carried out with pressure nozzles (nozzle atomization—including two fluid nozzles) or centrifugal or rotary atomizers operating at high speeds (e.g., a spinning disc). Despite the high velocity generation of droplets, a spray dryer is designed so that the droplets avoid a much as possible contact with the spray dryer wall under proper operating procedures. This effect is achieved by a precise balance of atomizer velocity, air flow, spray dryer dimensions, e.g., height and diameter, and the design of inlet and outlet means to produce a cyclonic flow of gas, e.g., air in the chamber. A pulse atomizer also can be used to produce the small droplets needed to facilitate evaporation of the water. In some cases, it may be desirable to include a flow promoter, such as calcium stearate and/or an aluminosilicate material, in the aqueous dispersion that is processed in a spray dryer simply to facilitate subsequent handling and transport of the spray dried powder (e.g., to avoid clumping).

As noted, the aqueous phenol-formaldehyde resin composition, e.g., a resole resin, used in this invention to make a powdered resole resin typically has a resin solids content before dilution for spray-drying of 30% to 65% by weight, usually from about 30% to 50% solids by weight.

The particle size and moisture content of the spray dried powder (and accordingly the bulk density of the powder) is a complex function, inter alga, of the air feed rate and temperature, liquid feed rate and temperature, liquid droplet size and the solids concentration of the feed liquid. Usually, the moisture content of the spray-dried powder is less than 6% by weight.

The particle size distribution, moisture content, and bulk density of the spray dried resin is controlled by operations well known in the spray drying art by variables such as feed resin solids content of the aqueous mixture, surface tension, speed of the rotary atomizer, feed rate of the aqueous resin, and the temperature differences between the inlet and outlet (atomization gas temperature). Particle size distribution may be an important factor in production of a powdered resin. In the case of a powdered resin for the present invention, including for waferboard and for oriented strandboard applications, a suitable range of particle sizes is having 80 to 90% by weight of the resin powder less than 75 microns and 60 to 70% by weight less than 45 microns.

If a desired particle size is not produced directly by the technique used to produce the resole resin particulate solids, additional mechanical grinding can be employed to reduce the distribution of the particle sizes further.

The other component of the adhesive binder formulation of the present invention is the aqueous phenol-formaldehyde resole resin liquid. This component can be prepared in much the same fashion as the resole resin composition destined for spray drying, i.e., using the same ingredients and procedures discussed in some detail above; accordingly that discussion will not be repeated here.

Suffice it to say, the main distinction between the resole resin precursor destined for spray drying and the aqueous phenol-formaldehyde resole resin liquid used to produce the adhesive binder formulation of the present invention pertains to the solids content of the resin. Usually, in the manufacture of an adhesive binder formulation one attempts to maximize the level of dissolved solids in the liquid resin component without jeopardizing the stability and ease of use of the resin liquid. Thus, while the dissolved solids content of the aqueous phenol-formaldehyde resole resin liquid can broadly be in the range of 30% to 70% by weight, it is usually at least 40% by weight and often is at least 50% by weight, and up to 70%.

In its broadest aspect, preparing an adhesive binder formulation of the present invention can simply involve blending the powdered phenol-formaldehyde resole resin into the aqueous phenol-formaldehyde resole resin liquid. This blending is accomplished by simply mixing the resole resin powder particles with the liquid resin. The powdered phenol-formaldehyde resole resin can be added in an amount of from 0.2 to 10% of powdered phenol-formaldehyde resole resin solids by weight of the solids in the aqueous phenol-formaldehyde resole resin liquid. In other words, for each 100 parts by weight of the dissolved solids in the aqueous phenol-formaldehyde resole resin liquid, one would add from 0.2 to 10 parts by weight of powdered phenol-formaldehyde resole resin solids. Often from 0.2 to 5% of powdered phenol-formaldehyde resole resin solids by weight of the solids in the aqueous phenol-formaldehyde resole resin liquid will be used.

Applicants have unexpectedly found that the powdered phenol-formaldehyde resole resin particles do not dissolve in the aqueous, alkaline phenol-formaldehyde resole resin liquid, but rather remain easily dispersed and suspended in the adhesive formulation prepared by blending these two components together. Thus, the dispersion of the powdered phenol-formaldehyde resole resin particles in the aqueous, alkaline phenol-formaldehyde resole resin liquid represents a stable material of commerce. It can be shipped and/or stored as a dispersion, in the same way aqueous resole resins have previously been shipped, for subsequent use directly as an adhesive formulation, without the addition of any further adhesive binder components, such as fillers and/or extenders, or it can be shipped and/or stored as a dispersion for subsequent blending with other adhesive binder ingredients, such as fillers, extenders, and caustic. Being able to handle and process the dispersion of the spray-dried resole resin in the aqueous resole resin in this way was quite surprising because it was thought that the powdered resole resin particles would, at a minimum, experience sufficient dissolution or softening at the surface of the solid powdered resole resin particles in the environment of the aqueous alkaline liquid resole resin to promote the sticking or clumping together of the particles with the result that such agglomerates would eventually experience undesired settling. Fortunately, that does not occur, and the powdered resole resin particles remain in suspension, easily dispersed in the resole resin liquid within the time constraints typically encountered for using aqueous resole resin-based adhesives.

While not wishing to be bound by any particular theory, applicants believe that during the formation of the powered phenol-formaldehyde resole resin particles, such as by the spray drying of an aqueous precursor resin, sufficient drying accompanied by resin advancement, e.g., B-staging of the resole resin, occurs at least on the surface of the particles to insulate the particles from the effect of the aqueous alkaline environment of the liquid resole resin. The essentially moisture free surface of the powered resin particles may be characterized as a "case hardened surface." Such term means that the surface and a shallow depth of the particles have been heated to an extent that such area is essentially moisture free and consists of higher molecular weight phenol-formaldehyde species. This case hardened area thus serves as a seal to prevent, at least for the time needed to prepare and use the adhesive formulation, the aqueous alkaline environment from dissolving, partly or completely, the particles. In addition, the specific gravity of individual spray-dried particles tends to be the same, if not lower than the specific gravity of aqueous resole resins used in adhesive formulations. Accordingly, applicants have observed that the spray-dried particles readily remain dispersed in the so-formed dispersions.

In the broadest aspects of the present invention, the adhesive binder formulation, in addition to the aqueous phenol-formaldehyde resole resin liquid and the powdered phenol-formaldehyde resole resin may also include other common adhesive binder constituents such as additional caustic, amylaceous extenders such as wheat flour, proteinaceous extenders such as soya flour, fillers such as nutshell flours, tree bark flours and clays, viscosity control agents and the like.

In a more limited embodiment of the present invention, the adhesive binder formulation consists essentially of the aqueous phenol-formaldehyde resole resin liquid and the powdered phenol-formaldehyde resole resin. As used herein in connection with a description of this embodiment of the adhesive binder formulation of the present invention, the phrases "consisting essentially of" and "consists essentially of" mean that the adhesive solids contained in the adhesive binder formulation include substantially only the dissolved solids of the aqueous phenol-formaldehyde resole resin liquid and the dispersed solids of the powdered phenol-formaldehyde resole resin to the exclusion other adhesive solids, such as adhesive fillers and/or extenders, except in only very limited nonfunctional amounts.

The adhesive binder formulations of the present invention can be used in the same manner as adhesive binder formulations of the prior art. The adhesive binder formulation is sufficiently fluid to be applied to wood substrates by spraying, using curtain coaters, using roll coaters, or any of the other well-known adhesive application techniques and equipment.

While the adhesive binder formulation of the present invention has broad applicability for the preparation of wood composites made using the wide variety of wood substrates, including wood veneer such as used for making plywood and LVL, the adhesive binder formulation has particular utility in the preparation of wood composites made from wood pieces (such as wood stands (OSB and OSL), wood chips (waferboard), wood flakes (flakeboard), wood fibers (fiberboard) and wood particles (particleboard)). Wood composite products that can be made using the adhesive binder formulation thus include: oriented strand board (OSB), oriented strand lumber (OSL), medium density fiberboard (MDF), Paralam®, hardboard, waferboard, chipboard, particleboard, flakeboard and the like. In these applications, the adhesive binder formulation consists essentially of a fluid mixture of the aqueous phenol-formaldehyde resole resin liquid and the powdered phenol-formaldehyde resole resin, where the powdered phenol-formaldehyde resole resin is dispersed in the aqueous phenol-formaldehyde resole resin liquid.

As noted above, the adhesive formulation for making wood composites from wood pieces (such as wood stands (OSB and OSL), wood chips (waferboard), wood flakes (flakeboard), wood fibers (fiberboard) and wood particles (particleboard)) consists essentially of powdered phenol-formaldehyde resole resin dispersed in the aqueous phenol-formaldehyde resole resin liquid in an amount of from about 0.2 to 10% by weight of the solids in the aqueous phenol-formaldehyde resole resin liquid, i.e., from 0.2 part by weight to 10 parts by weight of powdered phenol-formaldehyde resole resin solids are used for every 100 parts by weight of the dissolved resin solids in the aqueous phenol-formaldehyde resole resin liquid, and more usually the powdered resole is used in an amount of from 0.2 to 5% by weight of the solids in the aqueous phenol-formaldehyde resole resin liquid.

Consolidated wood composites having an acceptable internal bond strength and a satisfactory durability are formed by using the adhesive binder formulation of the present invention. A surprising result of using the adhesive binder formulation of the present invention is that the production capacity can be increased (lower press time used) while at the same time improving the quality of the bond between wood pieces and expanding the operating conditions for making acceptable composite products, i.e., acceptable product can be made under more extreme conditions, as compared to an adhesive binder formulation which uses the liquid resole resin alone.

Again, while not wishing to be bound by any particular theory, applicants believe that the presence of the powdered resin in the liquid adhesive formulation provides a combination of (1) spot-welding of the phenol-formaldehyde resin between adjacent pieces of wood which results in stronger bonding, i.e., improved bond quality, and (2) retardation, if not prevention, of the absorption of the dissolved phenol-formaldehyde solids of the phenol-formaldehyde resin liquid into the wood substrate (dry-out resistance), thus allowing more of the resin to be kept in a location where it can effectively bond the wood, which also contributes to improved bond quality.

The amount of adhesive binder formulation to use in any particular circumstance for manufacturing a wood composite panel will generally depend on the characteristics desired in the final wood composite product. Generally, the amount of binder can vary from about 1 weight percent up to about 12 weight percent of total resin solids based on oven dry weight of the wood pieces. Usually, at least 2 percent by weight and no more than about 8 percent by weight should be needed in most cases. While an amount of resin solids more than 12 weight percent can be used; a greater amount is not usually cost efficient.

As appreciated by those skilled in the art, during the preparation of wood composites, particularly such as OSB, waferboard, chipboard, particleboard, flakeboard and the like, wax also can be applied to the wood pieces. Wax is commonly applied in order to enhance the moisture resistance of such wood composites.

Regardless of the technique used to apply the adhesive binder formulation to the wood substrate, such as to wood pieces such as wood stands (OSB and OSL), wood chips (waferboard), wood flakes (flakeboard), wood fibers (fiberboard) and wood particles (particleboard), the resin treated wood material is formed into a mat or board and positioned within or passed through a press cavity for consolidating the mat into a unitary composite. Such presses generally have a press cavity defined by opposing press platens. The press platens are heated and the press may also be designed to allow steam to be injected into the cavity where the wood composite is formed between the platens.

While acceptable wood composite products can be obtained using wood pieces having an average moisture content above 10 percent by weight, for more efficient operation, the average moisture content of the wood pieces in the mat entering the press should not exceed about 9 percent by weight. Usually, the average moisture content of the wood pieces will be between 3 percent and 9 percent by weight.

In accordance with the method of the present invention, once the combination of the adhesive binder treated wood substrate, such as a mixture of adhesive binder and wood pieces, is readied for consolidation, a board or mat is formed in or is introduced into a suitable press cavity.

After the board of the adhesive binder treated wood substrate, or the mat of adhesive binder treated wood pieces is disposed within the press cavity, the press can be closed to its final position for making a wood composite product of a specific thickness.

The quantity of wood furnish introduced into the press is proportioned so that closing the press to the desired thickness for the wood composite can be accomplished at conventional press platen pressures. Consolidation pressures within the mat between about 80 to 750 psig are typical. Typical press platen temperatures can range from about 135° C. to 230° C. (275° F. to 446° F.), with a press platen temperature of about 210° C. (410° F.) being more typical.

As shown in the following examples, applicants have observed that the presence of the powdered resin as a component of a liquid resin provides significant advantages.

In further embodiments, the present invention is:
1. An adhesive binder formulation comprising a fluid mixture of an aqueous phenol-formaldehyde resole resin liquid and a powdered phenol-formaldehyde resole resin, wherein the powdered phenol-formaldehyde resole resin is dispersed in the aqueous phenol-formaldehyde resole resin liquid.
2. An adhesive binder formulation consisting essentially of a fluid mixture of an aqueous phenol-formaldehyde resole resin liquid and a powdered phenol-formaldehyde resole resin, wherein the powdered phenol-formaldehyde resole resin is dispersed in the aqueous phenol-formaldehyde resole resin liquid.
3. The adhesive binder formulation according to any of the previous embodiments wherein the powdered phenol-formaldehyde resole resin is dispersed in the aqueous phenol-formaldehyde resole resin liquid in an amount of from 0.2 to 10% of dissolved solids in the aqueous phenol-formaldehyde resole resin liquid.
4. The adhesive binder formulation according to any of the previous embodiments wherein aqueous phenol-formaldehyde resole resin liquid has a total alkalinity in the range of 2 to 7 percent by weight.
5. The adhesive binder formulation according to any of the previous embodiments wherein the powdered phenol-formaldehyde resole resin is prepared by spray drying an aqueous, alkaline phenol-formaldehyde resole resin composition.
6. A wood composite comprising wood substrates, and especially wood pieces, bound together by a cured, adhesive binder formulation of any of the previous embodiments.
7. A method of making a wood composite comprising applying an adhesive binder formulation to wood pieces, wherein the adhesive binder formulation comprises a fluid mixture of an aqueous phenol-formaldehyde resole resin liquid and a powdered phenol-formaldehyde resole resin, wherein the powdered phenol-formaldehyde resole resin is dispersed in the aqueous phenol-formaldehyde resole resin liquid, and consolidating the wood pieces with the applied the adhesive binder formulation under conditions to produce the wood composite.
8. A method of making a wood composite according to the previous embodiment by mixing the adhesive binder formulation according to any of the previous embodiments with wood pieces; forming the wood pieces into a mat and consolidating the mat, through the application of heat and pressure, into the wood composite.

The following example provides an illustrative embodiment of the present invention and is not intended as a limitation on the scope of the invention. Unless otherwise indicated, all parts and percentages are by weight.

EXAMPLE 1

This example examines the difference between adding a powdered phenol-formaldehyde resole resin to a pre-mixed adhesive formulation versus having the aqueous phenol-formaldehyde resole resin liquid ultimately used to prepare an adhesive formulation initially fortified with a powdered phenol-formaldehyde resole resin. The Example also illustrates improvements realized from dispersing the spray-dried resole in the liquid resin, as compared to use of a liquid resin as the sole adhesive resin.

Southern pine veneer (⅛ inch thick) at 7% moisture content was used as the substrate for making wood composites using three different adhesive binder formulations. Adhesive A contained a liquid phenol-formaldehyde resole resin and standard fillers and extenders; Adhesive B was identical to Adhesive A and was made in the same manner, except that as an additional ingredient a powdered (spray-dried) phenol-formaldehyde resole resin also was added to the adhesive binder formulation in an amount of 0.7% by weight of the adhesive binder formulation. Adhesive C was identical in composition to Adhesive B except that the powdered (sprayed-dried) phenol-formaldehyde resole resin was first added to just the liquid phenol-formaldehyde resole resin and was stored as a mixture for about a week before the mixture (dispersion) of liquid and powdered resins was used to make the adhesive binder formulation. To provide the powdered (spray-dried) phenol-formaldehyde resole resin in an amount of 0.7% by weight of the adhesive binder formulation, it was necessary to add the powdered (spray-dried) phenol-formaldehyde resole resin to the liquid phenol-formaldehyde resole resin in an amount of 1.3% by weight of the liquid phenol-formaldehyde resole resin.

Five-ply panels were made with these adhesive binders. The adhesive binders were applied to the second and fourth plies using a roll coater at a glue (adhesive binder) spread of 30 grams per square foot of double glue line (0.032 g/cm²). Boards were pressed at a press temperature of 325° F. (163° C.)±10° F. Boards were made at press times of 354 seconds, 372 seconds, 390 seconds, and 408 seconds. There was no pre-press. Two panels were made at each press time.

Dry out resistance of the various adhesive binders also was tested using the same veneer and the same glue spread. After application of the adhesive binder, the two core sheets, second and fourth plies, were set to stand in a rack and inserted into a circulating air oven at 110° C. Oven dry times varied from 0 to six minutes. All of these oven-dried boards were assembled into the 5-ply panels and pressed at a press temperature of 325° F. (163° C.)±10° F. for a press time of 408 seconds. Again, there was no pre-press and two panels were made at each dry-out condition.

The manufactured panels then were tested using a method utilized for wet short span shear testing of LVL samples. The method is based on ASTM Method D 5456-09a section A4. The dimensions of the test samples used are 1½ in. (width) and a span of 6 times the thickness of the panel (+1 inch for overhang). The set-up of the testing apparatus utilizes a stand consisting of two ¾ inch round bearing points set to the span of each sample tested, allowing ½ inch overhang on each side. The load cell uses a ¾ inch round bearing point that applies pressure perpendicular to the span at the center point in the flat-wise orientation. Samples are loaded at a loading rate that targets failure at approximately 2 minutes. The test cycle utilized involves soaking of the samples in room temperature water in a vacuum-pressure tank under vacuum for 30 minutes followed by 30 minutes under pressure (75 psi). Samples were tested wet and compared to other wet samples. No dry testing was performed.

Figure 2:
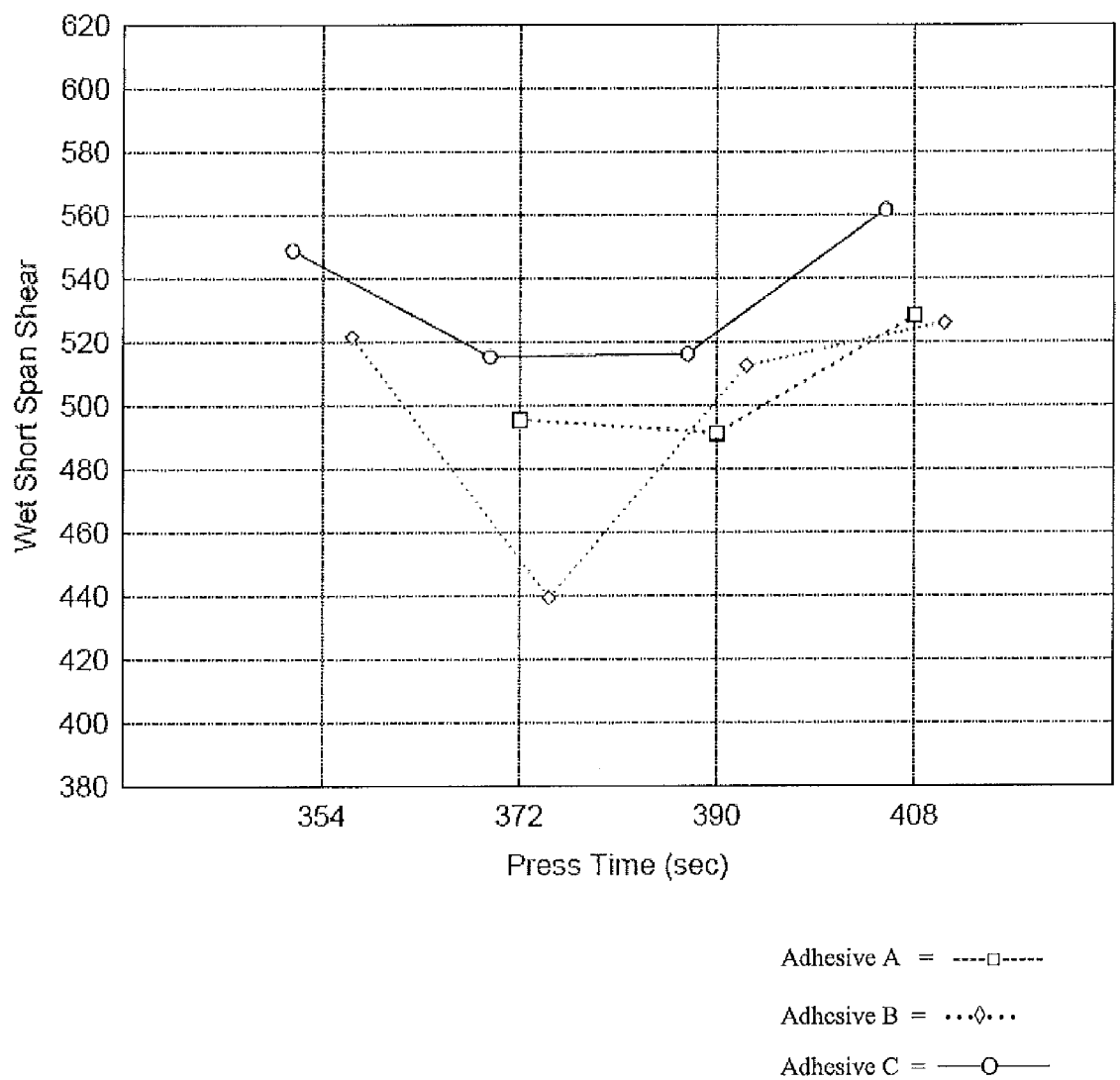
FIG. 2 is a graph showing wet short span shear testing results of LVL samples consolidated at different press times and made with three different adhesive binder formulations, one control and two embraced by the present invention.

FIG. 2 presents the wet short span shear testing results of panels at the different press times. At the lowest press time of 354 seconds, Adhesive A (the adhesive without any powdered resole resin) did not produce a suitable panel for testing; while both Adhesive B and C did. As shown the panels made with the powdered resin mixed into the liquid resin at least a week before preparing the adhesive binder (i.e., Adhesive C) performed best in these tests.

Figure 3:
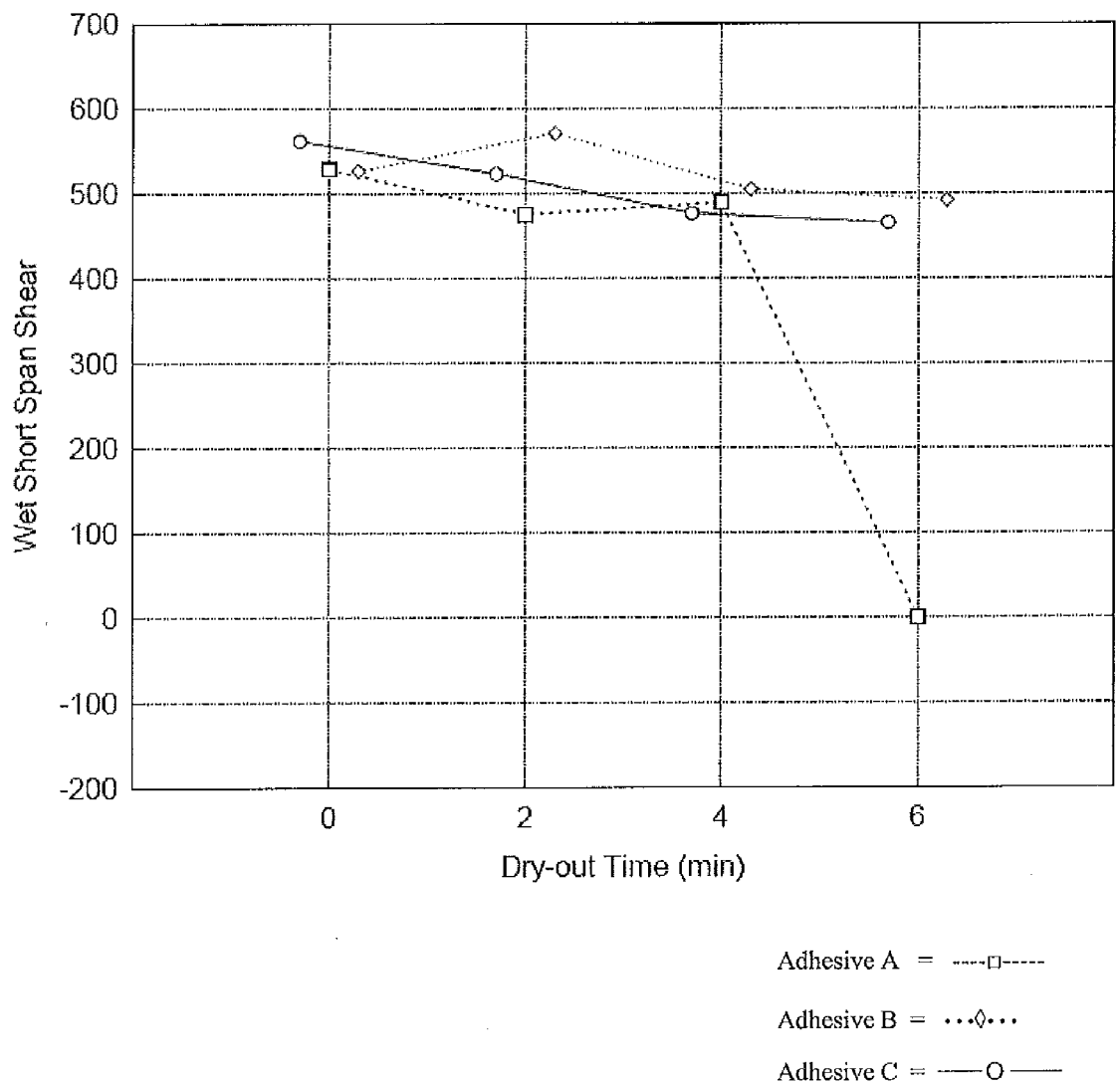
FIG. 3 is a graph showing wet short span shear testing results of LVL samples subjected to different dry-out conditions and then consolidated at the same press time, made with three different adhesive binder formulations, one control and two embraced by the present invention.

FIG. 3 presents the wet short span shear testing results of panels at the different oven dry-out times. As shown, at the longest oven time, both Adhesives B and C performed better than Adhesive A.

Permitting the powdered resole resin to be blended into the liquid resin long before the liquid resin is used directly as an adhesive binder, or is used to prepare an adhesive binder formulation, has significant commercial implications particularly in terms of the convenience of the board fabricator, since the need to have powdered resin storage and mixing capability can be avoided. Thus, board fabricators without such ancillary equipment can obtain the advantages provided by the adhesive binder formulation of the present invention.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and preferably is only about + or −2%.

We claim:

1. An adhesive binder formulation comprising a fluid mixture of an aqueous phenol-formaldehyde resole resin liquid and a powdered phenol-formaldehyde resole resin, wherein the powdered phenol-formaldehyde resole resin is dispersed in the aqueous phenol-formaldehyde resole resin liquid, wherein the powdered phenol-formaldehyde resole resin is in an amount of from 0.2 to 10% by weight.

2. An adhesive binder formulation consisting essentially of a fluid mixture of an aqueous phenol-formaldehyde resole resin liquid and a powdered phenol-formaldehyde resole resin, wherein the powdered phenol-formaldehyde resole resin is dispersed in the aqueous phenol-formaldehyde resole resin liquid, wherein the powdered phenol-formaldehyde resole resin is in an amount of from 0.2 to 10% by weight.

3. The adhesive binder formulation according to claim 1 or 2 wherein the powdered phenol-formaldehyde resole resin is dispersed in the aqueous phenol-formaldehyde resole resin liquid in an amount of from 0.2 to 5% by weight of dissolved solids in the aqueous phenol-formaldehyde resole resin liquid.

4. The adhesive binder formulation according to claim 3 wherein aqueous phenol-formaldehyde resole resin liquid has a total alkalinity in the range of 2 to 7 percent by weight.

5. The adhesive binder formulation according to claim 4 wherein the powdered phenol-formaldehyde resole resin is prepared by spray drying an aqueous, alkaline phenol-formaldehyde resole resin composition.

6. A wood composite comprising wood substrates bound together by a cured, adhesive binder formulation of claim 1.

7. A wood composite comprising wood pieces bound together by a cured, adhesive binder formulation of claim 2.

8. A method of making a wood composite comprising applying an adhesive binder formulation to wood substrates, wherein the adhesive binder formulation comprises a fluid mixture of an aqueous phenol-formaldehyde resole resin liquid and a powdered phenol-formaldehyde resole resin, wherein the powdered phenol-formaldehyde resole resin is dispersed in the aqueous phenol-formaldehyde resole resin liquid, wherein the powdered phenol-formaldehyde resole resin is in an amount of from 0.2 to 10% by weight and consolidating the wood substrates with the applied the adhesive binder formulation under conditions to produce the wood composite.

9. A method of making a wood composite according to claim 8 wherein the adhesive binder formulation is mixed with wood pieces; forming the wood pieces into a mat and consolidating the mat, through the application of heat and pressure, into the wood composite.

* * * * *